United States Patent
Weh et al.

(10) Patent No.: US 11,248,600 B2
(45) Date of Patent: Feb. 15, 2022

(54) PISTON PUMP ASSEMBLY FOR A HYDRAULIC POWER VEHICLE BRAKING SYSTEM

(71) Applicant: Robert Bosch GmbH, Stuttgart (DE)

(72) Inventors: Andreas Weh, Sulzberg (DE); Matthias Mayr, Rettenberg (DE); Matthias Koehler, Kempten (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 16/639,790

(22) PCT Filed: Jul. 19, 2018

(86) PCT No.: PCT/EP2018/069652
§ 371 (c)(1),
(2) Date: Feb. 18, 2020

(87) PCT Pub. No.: WO2019/037967
PCT Pub. Date: Feb. 28, 2019

(65) Prior Publication Data
US 2021/0122342 A1    Apr. 29, 2021

(30) Foreign Application Priority Data

Aug. 22, 2017 (DE) .................... 10 2017 214 593.5

(51) Int. Cl.
*F04B 53/14* (2006.01)
*F04B 9/04* (2006.01)
*F04B 17/03* (2006.01)

(52) U.S. Cl.
CPC ............. *F04B 53/14* (2013.01); *F04B 9/042* (2013.01); *F04B 9/047* (2013.01); *F04B 17/03* (2013.01); *B60Y 2400/81* (2013.01)

(58) Field of Classification Search
CPC .... F04B 9/02; F04B 9/04; F04B 9/042; F04B 9/047; F04B 17/03; F04B 53/14; B60T 8/4022; F15B 15/1414; B60Y 2400/81
(Continued)

(56) References Cited

U.S. PATENT DOCUMENTS 9,850,971 B1 * 12/2017 Demorais ............. F16D 55/226
10,919,510 B2 * 2/2021 Alili .......................... F15B 7/08
(Continued)

FOREIGN PATENT DOCUMENTS

CN           1894515 A      1/2007
CN        103547801 A       1/2014
(Continued)

OTHER PUBLICATIONS

International Search Report for PCT/EP2018/069652 dated Oct. 11, 2018.

*Primary Examiner* — Charles G Freay
*Assistant Examiner* — Chirag Jariwala
(74) *Attorney, Agent, or Firm* — Norton Rose Fulbright US LLP; Gerard Messina

(57) ABSTRACT

A piston pump assembly for a hydraulic power vehicle braking system including an electric motor, a planetary gear, a worm gear, and a piston displaceable in a cylinder. For an anti-rotation protection of the piston in the cylinder, the piston includes a ring rotationally-fixed thereto by a form fit and connected thereto by forming, including semicircular grooves at its outer circumference, in which cylinder pins engage, which are situated fixed axially-parallel in the cylinder.

7 Claims, 3 Drawing Sheets

(58) Field of Classification Search
USPC ....................................... 417/415; 92/165 PR
See application file for complete search history.

(56) References Cited

U.S. PATENT DOCUMENTS

| | | | |
|---|---|---|---|
| 11,136,016 B2* | 10/2021 | Weh | ........................ B60T 13/16 |
| 2014/0033914 A1 | 2/2014 | Abousaleh | |
| 2017/0030445 A1 | 2/2017 | Weh et al. | |
| 2017/0166177 A1* | 6/2017 | Weh | ........................ B60T 17/02 |
| 2017/0259799 A1* | 9/2017 | Weh | ........................ F04B 17/03 |
| 2018/0094683 A1* | 4/2018 | Kim | ...................... B60T 13/741 |
| 2018/0345934 A1* | 12/2018 | Weh | ........................ B60T 13/16 |
| 2019/0017502 A1* | 1/2019 | Ohm | ........................ F04B 53/14 |
| 2019/0100188 A1* | 4/2019 | Lee | ....................... B60T 8/4018 |
| 2020/0240443 A1* | 7/2020 | Alili | .................... F15B 15/1471 |

FOREIGN PATENT DOCUMENTS

| | | |
|---|---|---|
| CN | 104837696 A | 8/2015 |
| CN | 204527184 U | 8/2015 |
| CN | 106965790 A | 7/2017 |
| DE | 102014225595 A1 | 6/2016 |
| EP | 2006544 A2 | 12/2008 |
| WO | 2017089007 A1 | 6/2017 |

\* cited by examiner

PISTON PUMP ASSEMBLY FOR A HYDRAULIC POWER VEHICLE BRAKING SYSTEM

FIELD OF THE INVENTION

The present invention relates to a piston pump assembly for a hydraulic power vehicle braking system having the features.

BACKGROUND INFORMATION

Piston pumps are used in hydraulic power vehicle braking systems for generating a hydraulic brake pressure for a service brake application using external power and/or in slip-controlled vehicle braking systems also for generating a brake pressure and for conveying brake fluid from wheel brakes after a pressure reduction back to the wheel brakes in order to increase the wheel brake pressures again or back in the direction of a main brake cylinder during a slip regulation.

SUMMARY OF THE INVENTION

The piston pump assembly according to the present invention having the features described herein is provided for generating a brake pressure and/or for conveying brake fluid in a hydraulic power and/or slip-controlled vehicle braking system. It includes an electric motor as a drive, a worm gear, for example, a spindle drive, which converts a rotational drive movement of the electric motor into a translational movement, and a piston-cylinder unit, whose piston is displaceable in the cylinder using the worm gear. This involves a relative movement between piston and cylinder, the cylinder may also be displaced on the piston. A reduction gear, for example, a planetary gear, may be connected between the electric motor and the worm gear.

For an anti-rotation protection of the piston in the cylinder, the piston includes a radially protruding rotation-locking element, which is rotationally fixed and which may also be axially fixed to the piston and is supported in at least one and which may be both circumferential directions at a thrust bearing of the cylinder. The thrust bearing may be, for example, a cylinder pin fixed axially parallel in the cylinder or an axially-parallel or also spiral rib. The support of the rotation-locking element of the piston at the thrust bearing holds the piston against co-rotating with the worm gear during its axial displacement in the cylinder. The piston may be displaced exclusively axially in the cylinder without rotation, but it may also twist during its axial displacement in the cylinder, i.e., execute a helical movement; however, it may not rotate freely in the cylinder. The support of the rotation-locking element at the thrust bearing in the circumferential direction may be free of play or has little play; however, play is possible in the circumferential direction, so that the piston may rotate to a limited extent in the cylinder.

The rotation-locking element is a component separate from the piston or in any case a component manufactured separately from the piston, which is situated in a rotationally-fixed manner at the piston.

In one embodiment of the present invention, the rotation-locking element is a ring situated in a rotationally-fixed manner and like a flange at the piston, which circumferentially protrudes radially from the piston or circumferentially projects radially beyond the piston. The ring may be situated at one end of the piston or with spacing from ends of the piston at a point of the piston in the axial direction which is arbitrary per se.

The further descriptions herein have as the subject matter advantageous embodiments and refinements of the present invention specified herein.

The subject matter as described herein includes a hydraulic block of a hydraulic assembly for a hydraulic vehicle braking system, in particular a power vehicle braking system and/or a vehicle braking system having a slip regulation. The hydraulic block is or will be equipped with solenoid valves and further hydraulic components of the vehicle braking system, which are used for a brake pressure regulation or a brake pressure control in the case of power brake application and/or during a slip regulation. The hydraulic block includes a borehole, depression, or the like as a receptacle for the cylinder of the piston pump assembly, the electric motor is attached to the worm gear and optionally an interconnected reduction gear or is attached externally at the hydraulic block. The piston pump assembly is also a hydraulic component of the power vehicle braking system or the slip regulation. Equipped with the hydraulic components, the hydraulic block forms a hydraulic assembly, which is connected by one or more brake lines to a main brake cylinder, if it does not contain the main brake cylinder, and to which hydraulic wheel brakes of the vehicle braking system are connected by brake lines.

The present invention is explained in greater detail hereafter on the basis of a specific embodiment shown in the drawings.

DETAILED DESCRIPTION

Figure 1:
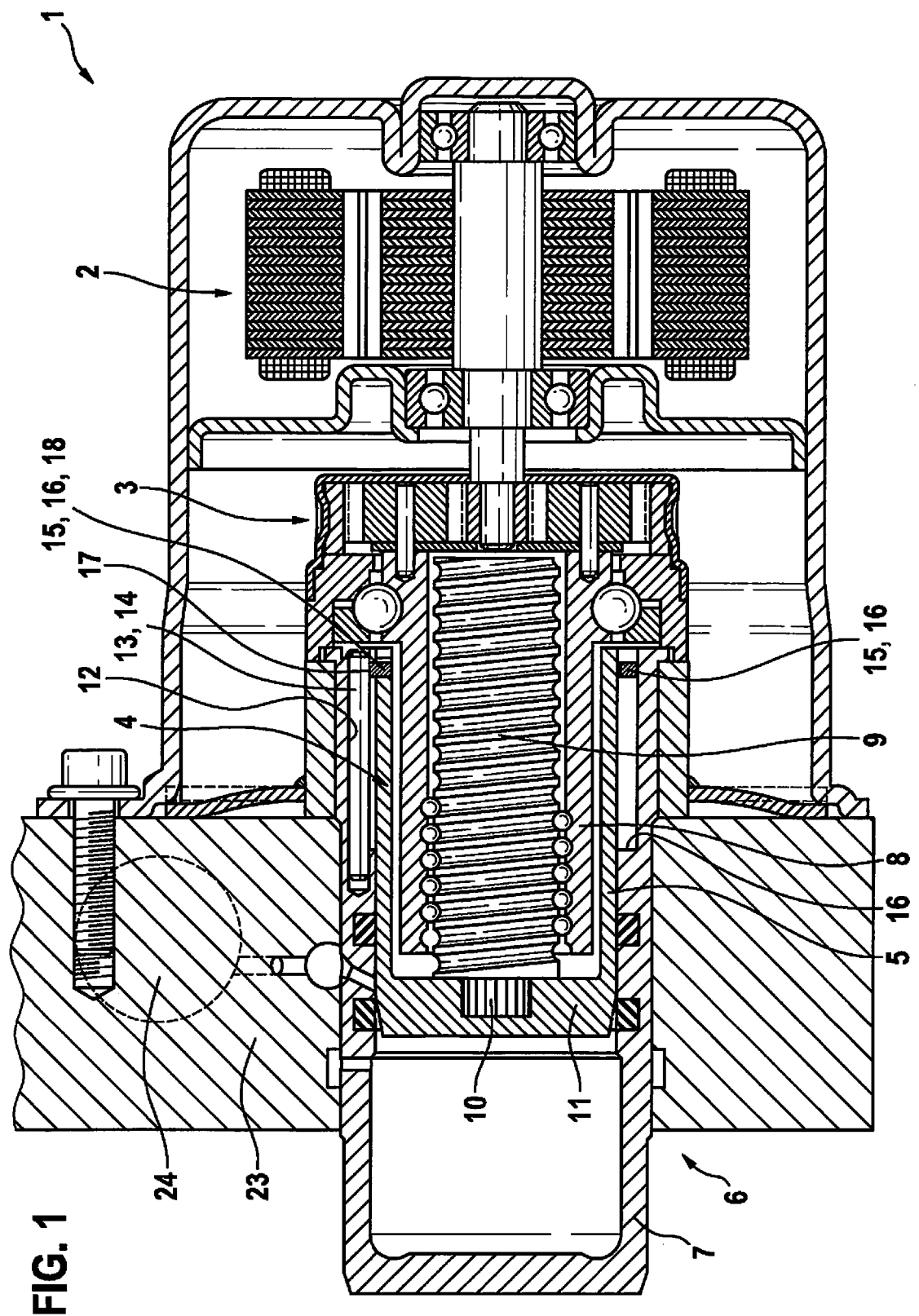
FIG. 1 shows an axial section through a piston pump assembly according to the present invention.

Piston pump assembly 1 according to the present invention, which is shown in the drawings, is provided for pressure generation in a hydraulic power vehicle braking system and/or for pressure generation and conveyance of brake fluid in a slip-controlled hydraulic vehicle braking system during a slip regulation. Such slip regulations are, for example, antilock braking systems, traction control systems, vehicle dynamic stability controllers, and electronic stability programs, for which the abbreviations ABS, TCS, VDC, and ESP are commonly used.

For the drive, piston pump assembly 1 according to the present invention includes an electric motor 2, using which a planetary gear 3 is drivable, which may generally also be understood as a mechanical reduction gear. Planetary gear 3 drives a worm gear 4 to rotate, which converts the rotational movement into a displacement to displace a piston 5 of a piston-cylinder unit 6 in a cylinder 7. In the described and explained specific embodiment of the present invention, worm gear 4 is a ball screw drive. Piston 5 is axially displaceable in cylinder 7, a displacement direction of piston 5 in cylinder 7 is thus axial.

Planetary gear 3 drives a nut 8 of worm gear 4 to rotate and nut 8 displaces a spindle 9 of worm gear 4. Notwithstanding this, vice versa, spindle 9 may also be driven to rotate and nut 8 is displaced together with piston 5. An end of spindle 9 remote from planetary gear 3 and electric motor 2 is connected in a rotationally-fixed and axially-fixed manner to piston 5 by a pin 10, which is as one piece with it, and which is pressed into a blind hole in a piston bottom 11 of piston 5, so that piston 5 is displaced with spindle 9. In the described and shown specific embodiment of the present invention, pin 10 of spindle 9 has a knurl including axially-parallel grooves.

Piston 5 is configured as a hollow piston, which is closed as one piece by its piston bottom 11 at an end remote from planetary gear 3 and electric motor 2 and which encloses nut 8 of worm gear 4 in cylinder 7 of piston-cylinder unit 6. The mentioned components of piston pump assembly 1, i.e., electric motor 2, planetary gear 3 situated between electric motor 2 and worm gear 4, worm gear 4, piston 5, and cylinder 7 are coaxial.

Figure 3:
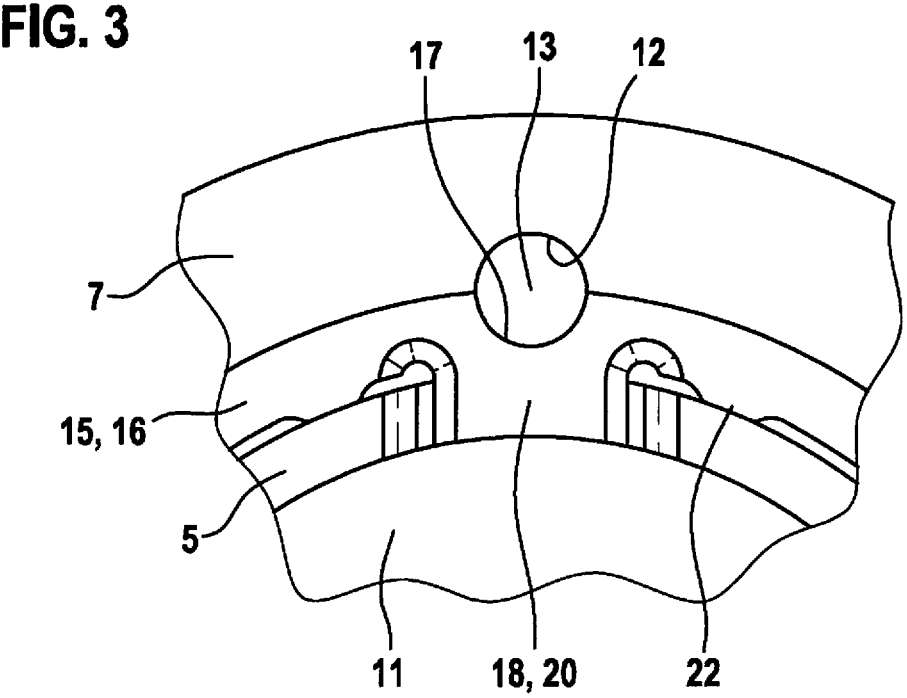
FIG. 3 shows an enlarged detail of a frontal view of the piston and a cylinder of the piston pump assembly from FIG. 1 having an axial viewing direction.

For an anti-rotation protection of piston 5 in cylinder 7, cylinder 7 includes three axially-parallel grooves 12 having semicircular cross sections distributed over a circumference on the inside, in which cylinder pins 13 are inserted as thrust bearings 14 (FIG. 3).

Figure 2:
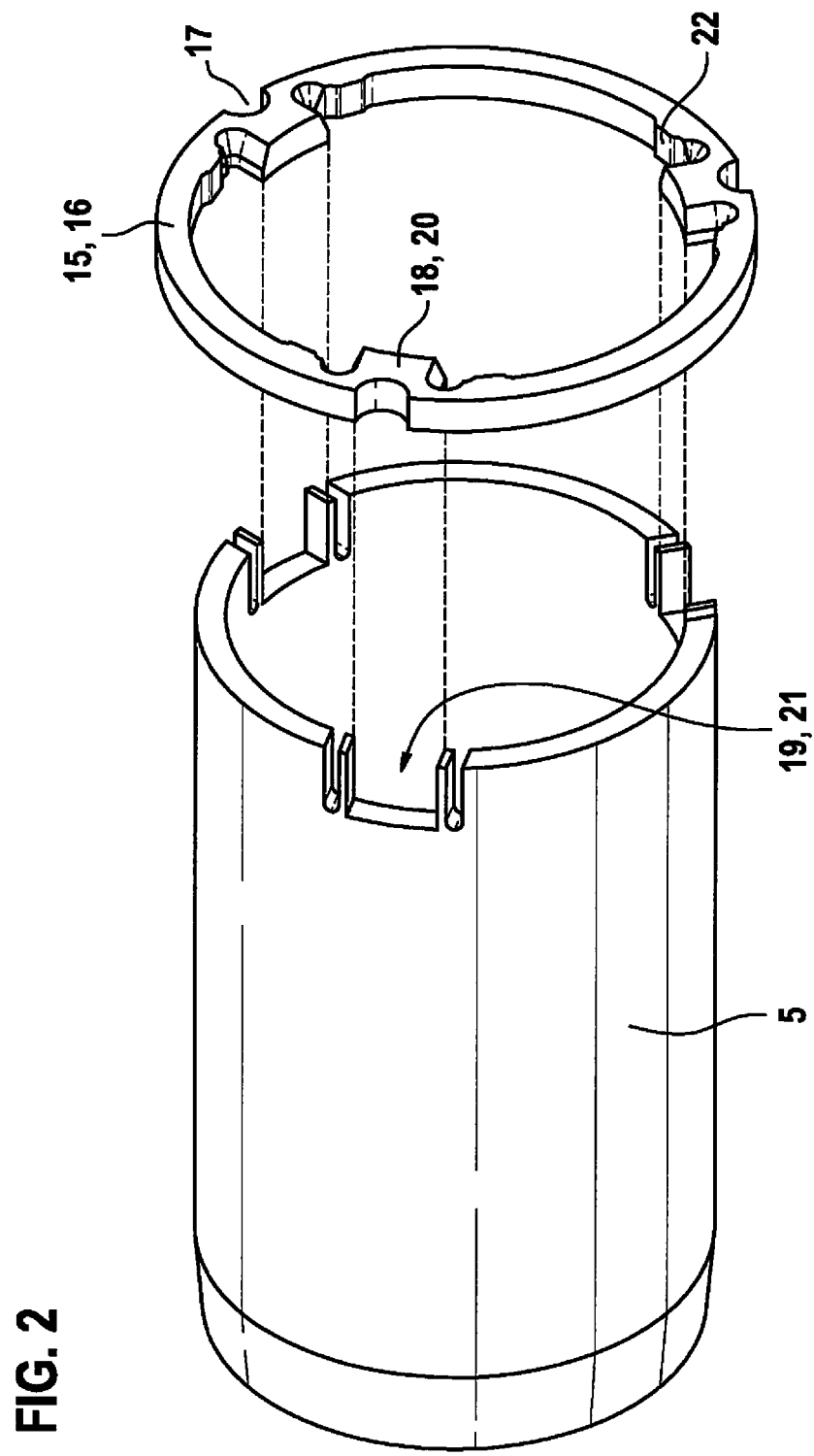
FIG. 2 shows a piston of the piston pump assembly from FIG. 1 in a perspective exploded view.

A ring 15, which is situated fixedly at piston 5 and is apparent in FIGS. 2 and 3, is also a component of the anti-rotation protection. Ring 15 has a rectangular, nearly square ring cross section, which is somewhat larger radially than axially. Ring 15, which may generally also be understood as a rotation-locking element 16, is situated close to an end of piston 5 facing toward planetary gear 3 and electric motor 2 in a radial plane of piston 5 and encloses piston 5 like a flange. Ring 15 protrudes radially outward from piston 5. Ring 15 includes three semicircular grooves 17 in its outer circumference, which penetrate ring 15 in an axially-parallel manner. Cylinder pins 13, which are situated axially parallel and are projecting inwardly in grooves 12 in cylinder 7, engage in grooves 17 of ring 15 forming rotation-locking element 16. With its grooves 17, ring 15 forming rotation-locking element 16 of piston 5 supports itself in both circumferential directions at cylinder pins 13 forming thrust bearings 14 in cylinder 7 of piston pump assembly 1 according to the present invention. Piston 5 is thus rotationally fixed and axially displaceable in cylinder 7.

In the exemplary embodiment, grooves 12, 17 and cylinder pins 13 are distributed uniformly over the circumference. An uneven distribution and/or a number other than three of grooves 12, 17 and three cylinder pins 13 is also possible. In principle, one groove 12, 17 and one cylinder pin 13 are sufficient, however, there may also be two, four, or more grooves 12, 17 and cylinder pins 13. Instead of cylinder pins 13, other thrust bearings 14 are also possible, for example, inwardly projecting, axially-parallel or helical ribs in cylinder 7, which engage in congruent or similar grooves in ring 15 forming rotation-locking element 16 of piston 5 (not shown).

At its grooves 17, ring 15 includes radially inwardly projecting tabs 18, which are accommodated in corresponding recesses 19 in the end of piston 5 facing toward planetary gear 3 and electric motor 2, whereby ring 15 is axially fixed and rotationally fixed with piston 5 in one direction. Tabs 18 may generally also be understood as form-fitting elements 20 and recesses 19 as corresponding receptacles 21.

Ring 15 is placed on piston 5 and is elastic because of grooves 17 and inwardly projecting tabs 18, which form U-shaped or C-shaped bows due to grooves 17, in the circumferential direction and in the radial direction. Ring 15, formed by rotation-locking element 16 of piston 5, is clamped around piston 5 and rests at piston 5 with a pre-tension. At its inner circumference, ring 15 includes low, inwardly protruding elevations as support elements 22, which are situated offset in relation to tabs 18 on both sides of and close to tabs 18 in the circumferential direction and using which ring 15 rests at the outer circumference of piston 5.

Figure 4:
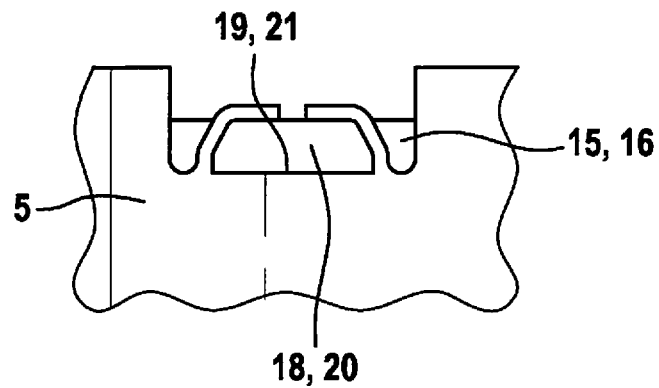
FIG. 4 shows an enlarged detail of the piston of the piston pump assembly from FIG. 1 having a viewing direction radially from the inside.

Recesses 19 forming receptacles 21 in the end of piston 5 are deeper than ring 15 is thick. On both sides of recesses 19, a front edge of piston 5, as is apparent in FIG. 4, is formed by overlapping tabs 18 forming form-fitting elements 20 of ring 15 forming rotation-locking element 16, so that ring 15 is connected in an axially-fixed manner to piston 5 by forming.

In the illustrated and described specific embodiment of the present invention, cylinder pins 13 and ring 15 forming rotation-locking element 16 are made of steel, ceramic, or fiber composite ceramic and piston 5 in cylinder 7 are made of an aluminum alloy. Generally speaking, cylinder pins 13 and ring 15 are made of a more wear-resistant material than piston 5 and cylinder 7. Regardless of the material from which it is made, ring 15 may include a sliding layer at its outer circumferential surface, i.e., at the surface which faces toward cylinder 7. Such a sliding layer is made of a more friction-reducing and/or wear-resistant material than ring 15 itself.

Piston pump assembly 1 according to the present invention is situated at and in a hydraulic block 23 of a slip regulation of a hydraulic power vehicle braking system (not shown otherwise), piston pump assembly 1 being part of the slip regulation. Such slip regulations and hydraulic blocks 23 are known per se to those skilled in the art and are not explained in greater detail here. Hydraulic block 23 is used for mechanical fastening and hydraulic interconnection of hydraulic, electrohydraulic, and electronic components of the slip regulation, which include, in addition to piston pump assembly 1, solenoid valves, check valves, hydraulic accumulators, and damper chambers, which are situated in and at hydraulic block 23 and are hydraulically interconnected with one another by a borehole (not shown) of hydraulic block 23 in accordance with a hydraulic circuit diagram of the power vehicle braking system and a slip regulation.

Cylinder 7 of piston pump assembly 1 is situated in a through hole of hydraulic block 23, which may generally also be understood as a receptacle of hydraulic block 23 for cylinder 7 of piston pump assembly 1. Electric motor 2 of piston pump assembly 1 is situated externally on one side of hydraulic block 23, for example, screwed together with hydraulic block 23. Equipped with piston pump assembly 1 and the further components of the slip regulation, hydraulic block 23 forms a hydraulic assembly which is part or a core part of the slip regulation. In the event of a service brake application, a brake pressure of the vehicle braking system is generated via external power using piston pump assembly 1 according to the present invention.

Hydraulic block 23 may include a main brake cylinder borehole 24 to house a muscle-power-actuated main brake cylinder (not shown) in hydraulic block 23. It is also possible to connect hydraulic block 23 or the hydraulic assembly using brake lines to a separate main brake cylinder. Hydraulic wheel brakes are connected using brake lines to hydraulic block 23 or the hydraulic assembly.

What is claimed is:

1. A piston pump assembly for a hydraulic vehicle braking system, comprising:

an electric motor;

a worm gear, which is rotationally drivable using the electric motor and converts a rotational movement of the electric motor into a displacement; and a piston-cylinder unit having a cylinder and a piston, which is displaceable using the worm gear in the cylinder;

wherein the piston includes a rotation-locking element that includes a flange that radially protrudes away from a body of the piston, the rotation-locking element being supported in a circumferential direction at a thrust bearing of the cylinder;

wherein the rotation-locking element includes a ring situated in a rotationally-fixed manner at the piston;

wherein the ring includes an inwardly projecting form-fitting element, which engages in a corresponding receptacle of the piston so as to connect the ring in at least one of the rotationally-fixed manner and an axially-fixed manner to the piston.

2. The piston pump assembly of claim 1, wherein the rotation-locking element is rotationally fixed with the piston in the axial and/or circumferential direction by a form fit.

3. The piston pump assembly of claim 1, wherein a length of the thrust bearing extends along a direction that is parallel to an axis of the piston.

4. The piston pump assembly of claim 3, wherein:
the thrust bearing includes a cylinder pin,
the rotation-locking element includes an outer circumference provided with a groove, and
the cylinder pin engages the groove.

5. A hydraulic block for a hydraulic vehicle braking system, comprising:
a piston pump assembly, including:
an electric motor;
a worm gear, which is rotationally drivable using the electric motor and converts a rotational movement of the electric motor into a displacement; and
a piston-cylinder unit having a cylinder and a piston, which is displaceable using the worm gear in the cylinder;
wherein the piston includes a rotation-locking element that includes a flange that radially protrudes away from a body of the piston, the rotation-locking element being supported in a circumferential direction at a thrust bearing of the cylinder;
wherein the cylinder is situated in a receptacle of the hydraulic block for the cylinder and/or the electric motor is situated on the hydraulic block;
wherein the rotation-locking element includes a ring situated in a rotationally-fixed manner at the piston;
wherein the ring includes an inwardly projecting form-fitting element, which engages in a corresponding receptacle of the piston so as to connect the ring in at least one of the rotationally-fixed manner and an axially-fixed manner to the piston.

6. The hydraulic block of claim 5, wherein a length of the thrust bearing extends along a direction that is parallel to an axis of the piston.

7. The hydraulic block of claim 6, wherein:
the thrust bearing includes a cylinder pin,
the rotation-locking element includes an outer circumference provided with a groove, and
the cylinder pin engages the groove.

* * * * *